United States Patent
Petit-Huguenin et al.

(10) Patent No.: US 9,538,013 B1
(45) Date of Patent: *Jan. 3, 2017

(54) METHOD AND SYSTEM FOR UPDATING PHYSICAL LOCATION INFORMATION

(71) Applicant: 8X8, Inc., San Jose, CA (US)

(72) Inventors: Marc Petit-Huguenin, Saratoga, CA (US); Bryan R. Martin, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/454,596

(22) Filed: Aug. 7, 2014

Related U.S. Application Data

(63) Continuation of application No. 13/773,460, filed on Feb. 21, 2013, now Pat. No. 8,804,704, which is a continuation of application No. 11/384,966, filed on Mar. 20, 2006, now Pat. No. 8,401,003.

(51) Int. Cl.
*H04W 4/02* (2009.01)
*H04M 7/00* (2006.01)
*H04L 29/12* (2006.01)

(52) U.S. Cl.
CPC ........ *H04M 7/0075* (2013.01); *H04L 61/2007* (2013.01)

(58) Field of Classification Search
CPC ...... H04L 12/66; H04L 65/1053; H04L 67/18; H04L 61/609; H04L 65/00; H04L 29/06292
See application file for complete search history.

(56) References Cited

U.S. PATENT DOCUMENTS

| | | |
|---|---|---|
| 6,266,535 B1 | 7/2001 | Cullen et al. |
| 2003/0097485 A1 | 5/2003 | Horvitz et al. |
| 2004/0125923 A1 | 7/2004 | See et al. |
| 2005/0063519 A1 | 3/2005 | James |
| 2005/0148345 A1 | 7/2005 | Kawai et al. |
| 2005/0169248 A1 | 8/2005 | Truesdale et al. |
| 2006/0047853 A1 | 3/2006 | Igarashi et al. |
| 2006/0072547 A1 | 4/2006 | Florkey et al. |
| 2006/0109960 A1 | 5/2006 | D'Evelyn et al. |
| 2006/0165133 A1* | 7/2006 | Yokota ............... H04L 12/12 372/6 |
| 2007/0030841 A1 | 2/2007 | Lee et al. |

(Continued)

OTHER PUBLICATIONS

"Reset—Definition and More from the Free Merriam-Webster Dictionary." Dictionary and Thesaurus—Merriam-Webster Online. Merriam-Webster: Web. Dec. 20, 2011. <http://www.merriam-webster.com/dictionary/reset>.

*Primary Examiner* — Luat Phung
(74) *Attorney, Agent, or Firm* — Crawford Maunu PLLC

(57) ABSTRACT

A method and system for updating physical location data associated with a VoIP endpoint device is implemented in a variety of embodiments. In one such embodiment, a VoIP endpoint device stores an identifier for a packet-communicating device which is subject to changing. The VoIP endpoint device has an interface for communication over the Internet via the packet-communicating device and uses a circuit-implemented method for prompting a VoIP user to update physical location data associated with the VoIP endpoint device. In response to a power state transition and a change in the stored identifier, the VoIP endpoint device facilitates an update to the physical location data associated with the VoIP service.

13 Claims, 3 Drawing Sheets

(56) References Cited

U.S. PATENT DOCUMENTS

| | | |
|---|---|---|
| 2007/0070990 A1 | 3/2007 | Chong et al. |
| 2007/0189469 A1 | 8/2007 | Croak et al. |
| 2007/0190974 A1* | 8/2007 | Zhang ............... H04L 63/08 455/411 |
| 2008/0271162 A1* | 10/2008 | Fujimura ............ G06F 21/10 726/29 |
| 2009/0003312 A1 | 1/2009 | Velazquez et al. |

* cited by examiner

METHOD AND SYSTEM FOR UPDATING PHYSICAL LOCATION INFORMATION

FIELD OF THE INVENTION

The present invention relates generally to Voice-Over-Internet Protocol (VoIP) telephony systems and the notification to VoIP customers that their physical location information must be updated with their service provider.

BACKGROUND

Telephony services are offered through a variety of avenues, such as landline phones, cellular phones, and more recently, Voice-Over-Internet Protocol (VoIP). VoIP is a relatively new telephony service that provides communications using Internet protocols rather than the traditional telephone service. VoIP service allows calls to be made to, and received from, traditional phone numbers using a high-speed (broadband) Internet connection (i.e., DSL, cable modem, or broadband wireless technology) instead of using the traditional telephone communication lines. VoIP is implemented by either placing an adapter between a traditional phone and broadband connection or by using a special VoIP phone that connects to a computer or Internet connection.

Traditional wireline phone services have generally associated a particular phone number with the fixed physical location of the corresponding telephone line. Cellular telephony services determine a cellular caller's physical location by associating the cellular phone with the physical location of the cellular network antenna with which the cellular customer's radio (telephone) is communicating. VoIP services, however, enable consumers to take their home or business phone service almost anywhere because VoIP services can be used from virtually any broadband connection anywhere in the world. This portability raises a number of challenges for the emergency services community in that it makes determining the location of a VoIP caller extremely difficult, if not impossible, because the only information transmitted across the Internet from VoIP callers is the Internet Protocol (IP) addresses associated with the call traffic. Currently there is not a reliable means of mapping an IP address to a precise physical location anywhere in the world.

Emergency 911 calls from a traditional telephone are usually sent to emergency service providers who are responsible for helping people in a particular geographic area or community. These emergency service providers often can automatically identify the caller's location and direct the closest emergency personnel to that location. They also often automatically identify the caller's telephone number so that the caller can be reached in the event the emergency call is disconnected.

Consumers with VoIP telephone service have experienced problems accessing 911 emergency services in the same manner as traditional communication services due to the lack of any physical location information associated with their telephone. In some instances, these problems were caused by the consumer failing to provide certain information (such as physical location information) to their VoIP provider in order for their VoIP provider to be able to set up 911 service or the consumer moving their VoIP service to another location without updating their physical location information with the VoIP service provider.

One proposed approach for alleviating these problems involves a communication cycle between a VoIP telephone adapter and a communication network where the VoIP telephone adapter communicates with the network once every twenty-four hours. Every time the telephone adapter is disconnected from a power source and reconnected, it communicates with the network to "check in," and the communication cycle is reset. The network then identifies that the cycle has been reset and recognizes that this could mean that the VoIP telephone adapter, and consequently the customer, has changed locations. Therefore, upon detection of a shift in the communication cycle, the network temporarily suspends the customer's service and posts a message at the customer's web portal directing the customer to confirm the existing registered physical location information or to register a new physical address. Any calls attempted before this physical location information has been confirmed or changed are intercepted and require the caller to confirm or change the physical location information before a call can be completed. This suspension of service does not affect 911 calls, which continue to be associated with the previously registered physical location information.

This approach is dependent upon the timing of the communication signal from the telephone adapter and burdens the consumer by denying phone service until the physical location information is resolved. Further, this approach is initiated, for example, every time a customer powers on/off their system, loses power, reboots the router, or loses Internet connectivity; therefore the customer loses phone service after each of these occurrences, which in many cases are not the result of a location change and instead create a "false positive" trigger. This inconveniences the customer by suspending telephone service unnecessarily.

The above and other difficulties continue to present challenges to providing effective emergency 911 telephone services and protecting the public safety.

SUMMARY

The present invention is directed to overcoming the above-mentioned challenges and others related to the types of devices and applications discussed above. These and other aspects of the present invention are exemplified in a number of illustrated implementations and applications, some of which are shown in the figures and characterized in the claims section that follows.

In one embodiment, the VoIP endpoint device stores an identifier for a packet-based communicating device which is subject to changing. The VoIP endpoint device has an interface for communication over the Internet via the packet-based communicating device, and a circuit-implemented method for prompting a VoIP user to update physical location data associated with the VoIP endpoint device. In response to a power state transition and a change in the stored identifier, the VoIP endpoint device facilitates an update to the physical location data associated with the VoIP service.

In another example embodiment, a method includes a VoIP endpoint device that stores a previously-obtained router address and has an interface for communication with a router providing a current router address. The method prompts a VoIP user to update physical location data which is associated with the VoIP endpoint device and useful for an emergency services provider. To this end, the method determines that an endpoint device has experienced a power state transition. In response to the power state transition and as a function of the stored router address, the method determines whether the stored router address corresponds to the current router address. Upon determining that stored router address does not correspond to the current router address, the user is prompted to update the physical location data associated with the VoIP service.

According to another embodiment of the present invention, an endpoint device is used in connection with a VoIP telephony service that prompts a VoIP user to update physical location data associated with the user's VoIP service. The physical location data may be useful to an emergency services provider. The endpoint device includes non-volatile memory for storing a previously-obtained node address and a programmable circuit adapted to compare with the previously-obtained node address and to determine whether the current node address is different from the previously-obtained node address.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
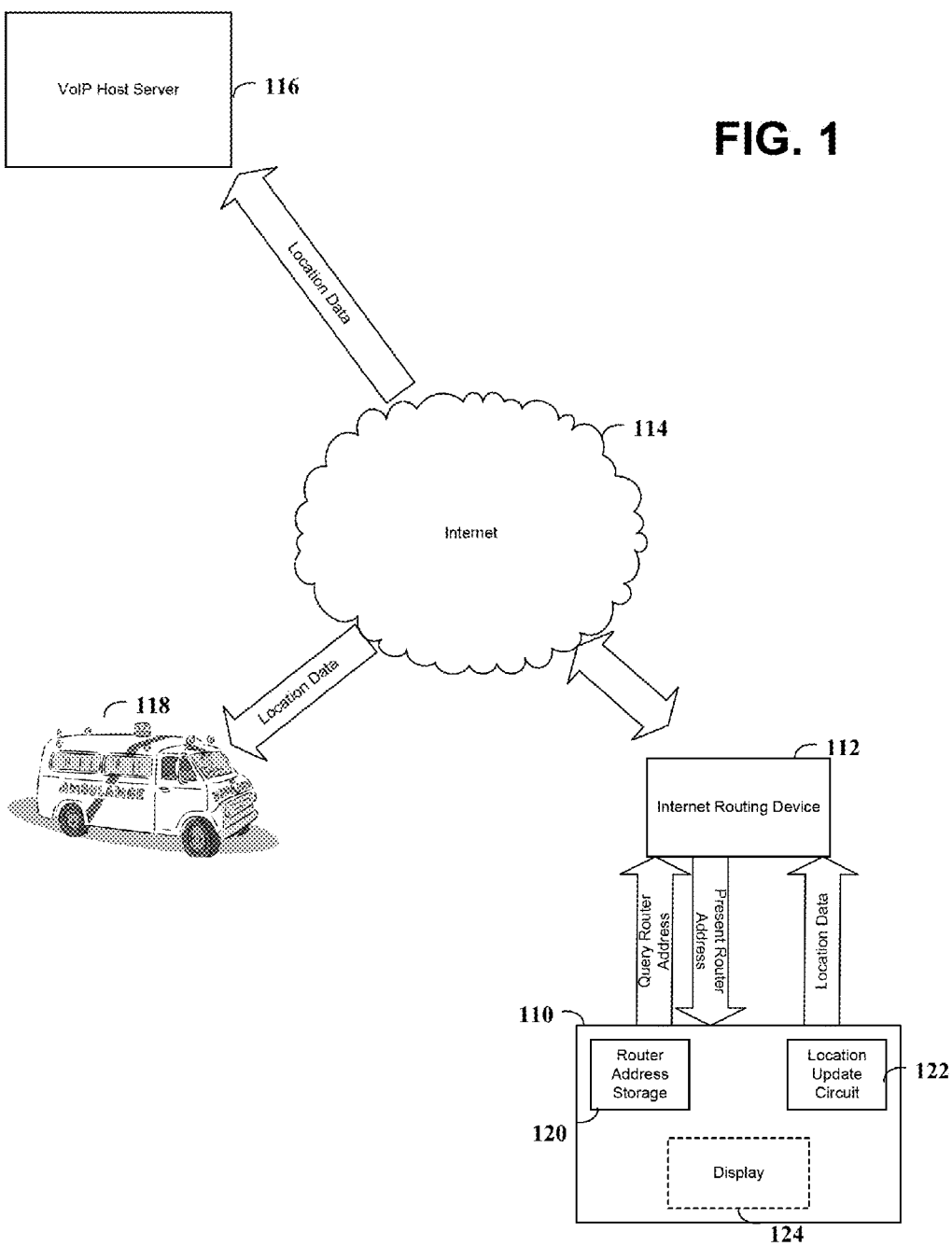
FIG. 1 is a flow diagram for determining whether physical location data should be updated with a VoIP service, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for aiding emergency-service providers in responding to VoIP telephone users by automatically prompting VoIP users to update their VoIP endpoint device's physical location data with their VoIP service. While the present invention is not necessarily limited to such applications, various aspects of the invention may be appreciated through a discussion of various examples using this context.

In an example embodiment of the present invention, a VoIP endpoint device recognizes a power-up situation and determines whether the endpoint device has changed geographic locations since the endpoint device's previous power-up. This determination is based on a change in an identifier corresponding to a packet-communicating device through which the VoIP endpoint device communicates. If there is no change in the identifier, the endpoint device has not changed locations; therefore, it is not necessary for the endpoint device's user to update the VoIP endpoint device's physical location data with the VoIP service provider. If, however, the identifier has changed, the endpoint device determines that it has moved to a new location and generates an output corresponding to the determination. This output may be used, for example, to prompt the user to update the device's physical location data with the VoIP service provider via a VoIP server.

The packet-communications device may communicate using packets of fixed length or variable length. The format of the packets may conform to any acceptable packet-based protocol and may vary based upon the VoIP service provider or other factors. In a specific example, the packet-based communications device may communicate using packets conforming to Internet-based protocols, such as IP-related packets.

The VoIP endpoint device is typically connected to a local communication device, such as a router or gateway that has one or more identifiers, such as media access control ("MAC") addresses and IP addresses. MAC addresses are by design typically unique for each communications device and often static for a particular device. For this reason, a change in a MAC address of the local communications device is often associated with the physical movement of the VoIP endpoint device. In some instances, however, the communications device may be moved with the VoIP endpoint device. For example, in many homes Internet users have their own router which they may take with them to a new location. In these instances, the MAC address of the router might not change when the VoIP device is physically moved.

In another embodiment, the VoIP device may use an IP address to determine a possible change in location. In a specific example, the wide area network ("WAN") address of a local communications device is used to determine if the VoIP device has been moved. The WAN address is usually determined by the upstream Internet-service-provider's location, and therefore, is subject to change when the VoIP device is moved.

In yet another embodiment, the VoIP device may use both the WAN and MAC addresses when determining whether the VoIP device has moved. For instance, if the MAC address has changed, it may be determined that the VoIP device has changed physical location regardless of the WAN address. Alternatively, if the MAC address has not changed but the WAN address has changed, it may be determined that the device has changed physical locations. Accordingly, the VoIP device may use other combinations of changes in the WAN and MAC address.

The aforementioned examples are not meant to be limiting. For example, various other device identifiers may be used, as well as using only portions of device identifiers (e.g., determining if a subnet of the WAN address has changed).

FIG. 1 shows a system and approach for updating the physical location data associated with a VoIP endpoint device, in accordance with an example embodiment of the present invention. Data is communicated among a VoIP endpoint device 110, an internet routing device 112, the Internet 114, a VoIP host server 116, and at least one emergency-service provider 118. When a VoIP endpoint device 110 experiences a power-up, it requests the address of the internet routing device 112 to which the endpoint device 110 is coupled. In one embodiment, the endpoint device 110 includes a processor that upon initialization (power-up) requests the address of the current internet routing device 112. In another embodiment, a circuit is designed to detect a power transition resulting in the endpoint device requesting the address of routing device 112. The endpoint device 110 uses this router address as an identifier for the internet routing device 112, and consequently, a potential change in location of endpoint device 110. The endpoint device 110 compares this current router address to a router address stored in the endpoint device 110.

While a variety of geographic identifiers may be contemplated, a specific example is an internet routing MAC address. Since an internet routing device's MAC address uniquely identifies the routing device, the internet routing device's MAC address is useful for determining when the endpoint device 110 has been connected to a different router. In another embodiment, the endpoint device 110 may request the WAN address of the router or the gateway of the local ISP. This WAN is typically an IP address that corresponds to the local ISP, and thus, a change in the WAN indicates that the endpoint device 110 has been moved. In an alternate embodiment, the endpoint device 110 may use both the MAC and WAN addresses when determining whether the endpoint device 110 has been moved. The remainder of this document refers to a MAC address for discussion purposes only and is not intended to limit the identifier used.

The router MAC address that was stored in the endpoint device's storage 120 was the router MAC address of the endpoint device 110 before the most recent power-up. Therefore, based upon the MAC address comparison, the endpoint device can determine whether it changed locations, e.g., via coupling to an internet routing device at a different network node, before the most recent power-up. After the router MAC address comparison is complete and before the endpoint device experiences another power-up, the current router MAC address is stored and replaces the previously-stored router MAC address to perpetuate the process. As discussed above, the WAN address of the local gateway may also be used (alone or in conjunction with the MAC address) to determine whether the endpoint device 110 has changed locations.

In another embodiment, further inspection can be performed upon the WAN address. For example, if the WAN address is within a certain subset of addresses, the WAN address of a subsequent node can be used. An example subset might include WAN addresses that correspond to a private range of addresses because private addresses are sometimes duplicated. For instance, two local networks in different locations might both use the private IP range of 192.168.0.0 to 192.168.255.255. Examples of other private IP ranges include 10.0.0.0 to 10.255.255.255, 172.16.0.0 to 172.31.255.255 and 169.254.0.0 to 169.254.255.255. Thus, if the WAN address happens to be located within a certain subset of addresses, the VoIP device can obtain the WAN address of a subsequent node in a packet transmission path. This second WAN address can be used to determine whether the device has potentially changed locations.

When the location update circuit 122 performs the comparison and determines that the current router MAC address is not the same as the stored router MAC address, the endpoint device prompts the device's user to update the device's physical location data. The user enters the updated information via the endpoint device 110 and the location data is transmitted via the internet routing device 112 and the Internet 114 to the VoIP host server 116. The information may be entered audibly or by the user keying in the updated location information. The updated information is then available to emergency-service providers, e.g., 118, when a 911 VoIP call is placed from the endpoint device 110.

In other implementations, the endpoint device 110 has a display 124 where the user may key in the location data to a webpage. Examples of such endpoint devices are stationary computers, portable computers, video-phones, and web-enabled cellular phones. One such implementation includes the endpoint device redirecting a user to a webpage once the router address comparison indicates that the endpoint device 110 has moved. Another implementation includes the endpoint device redirecting a user attempting to place an outgoing call to a physical location data page for entry or verification of the location data before the outgoing call is permitted.

Figure 2:
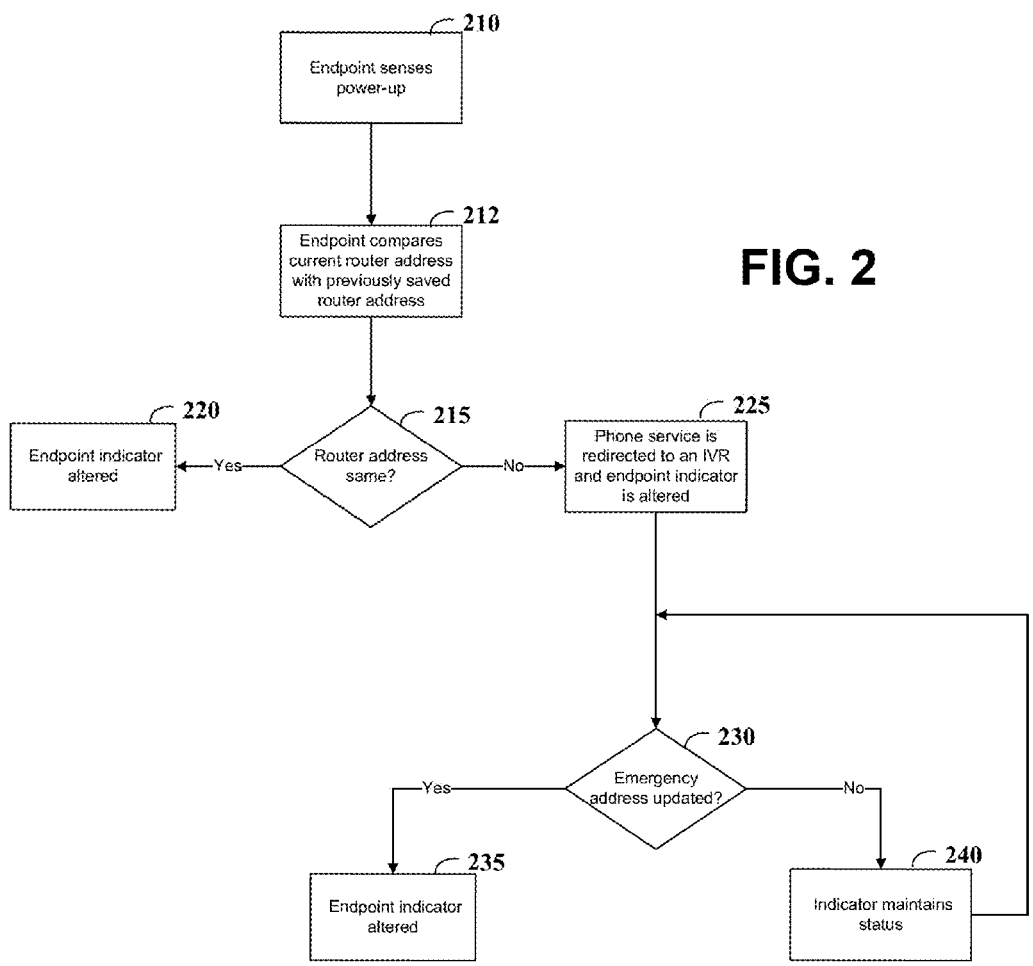
FIG. 2 is a flow chart illustrating a method for updating the physical location data for a VoIP user, according to an example embodiment of the present invention.

FIG. 2 shows a method for prompting a user to update the user's physical location with the user's VoIP service, according to another example embodiment. At block 210, the user's endpoint device, which can be, for example, a VoIP telephone, a standard telephone with an adapter, a computer (portable or stationary), or a cellular phone, determines that the device has been powered-up. The power-up may, for example, be a result of a power outage, a router reboot, or reconnection of the device after it was unplugged. At block 212, the device determines the current router address and compares this current router address with a router address that was previously stored in the device's non-volatile memory before power-up. This previously-stored router address was the endpoint device's previous router address prior to the power-up. The endpoint device compares the two router addresses to determine whether the current router address is the same as the previous router address at block 215. This comparison identifies whether the endpoint device has moved physical locations. If the router addresses are the same, the endpoint device determines that it has not moved to a different physical location; and therefore, no update of the physical location data is necessary. In contrast, if the router addresses are different, the endpoint device determines that it has moved to a different location which requires the user to provide the VoIP service with the new physical location data so that emergency services, if needed, are routed to the appropriate location.

If both addresses are the same, the endpoint device alters an indicator on the endpoint device at block 220 to signify to the user that their VoIP service is current, 911 emergency service is available, and no update of the physical location data is necessary. The indicator may, for example, be a light or LED that changes colors or changes a flashing cadence. The indicator could also be an audible or vibratory indicator.

If the router addresses are different, the endpoint device alerts the VoIP host server. The host server redirects outgoing calls to an interactive voice response (IVR) system to prompt the user to update the physical location at block 225. At block 225, the endpoint device also alters the endpoint indicator so that the user is alerted to the need to update the physical location before the user attempts to make an outgoing call. Another implementation includes redirecting the user to a webpage for entering the updated physical location data, such as when the endpoint device includes a display.

In one embodiment, the host server may also determine that the physical location information for one or more VoIP devices does not need to be updated even though the VoIP devices have indicated otherwise to the server. For example, if an administrator or ISP replaces a router that provides service to several VoIP devices, each of those devices may determine, after a power state transition, that their physical location has likely changed. The host server can be configured to detect that multiple VoIP devices have been affected by such a change and proactively determine that the physical location information does not need to be updated.

At block 230, the server determines whether the physical location data has been updated. If the address has been updated, the endpoint indicator is altered in the same manner as block 220 at block 235. If the address has not yet been updated, the endpoint indicator maintains the alert status at block 240 until the user updates the physical location data.

In another implementation, the endpoint device additionally sends the time the device powered-up, the uptime, to the VoIP server upon sensing a power-up. This may be sent in the header of an INVITE transmission. The server converts the uptime to an endpoint device start date (and optionally time) and compares the start date to the date that the physical location data was last updated. If the endpoint device start date is later than the location-update date, the user's physical location data likely needs to be updated. The intervening power-up task indicates that the endpoint device may have moved locations. As a result, outgoing calls are redirected to an IVR as discussed in connection with block 225. Outgoing calls may be redirected based upon the comparison of the start date to the date that the physical location data was last updated, the router addresses, or as a function of both comparisons. Once the physical location data is updated, or verified as being unchanged, the location-update date will also be updated. If the location-update date is later than the endpoint device start date, the server recognizes that the physical location data has already been updated and further updating is not required.

Figure 3:
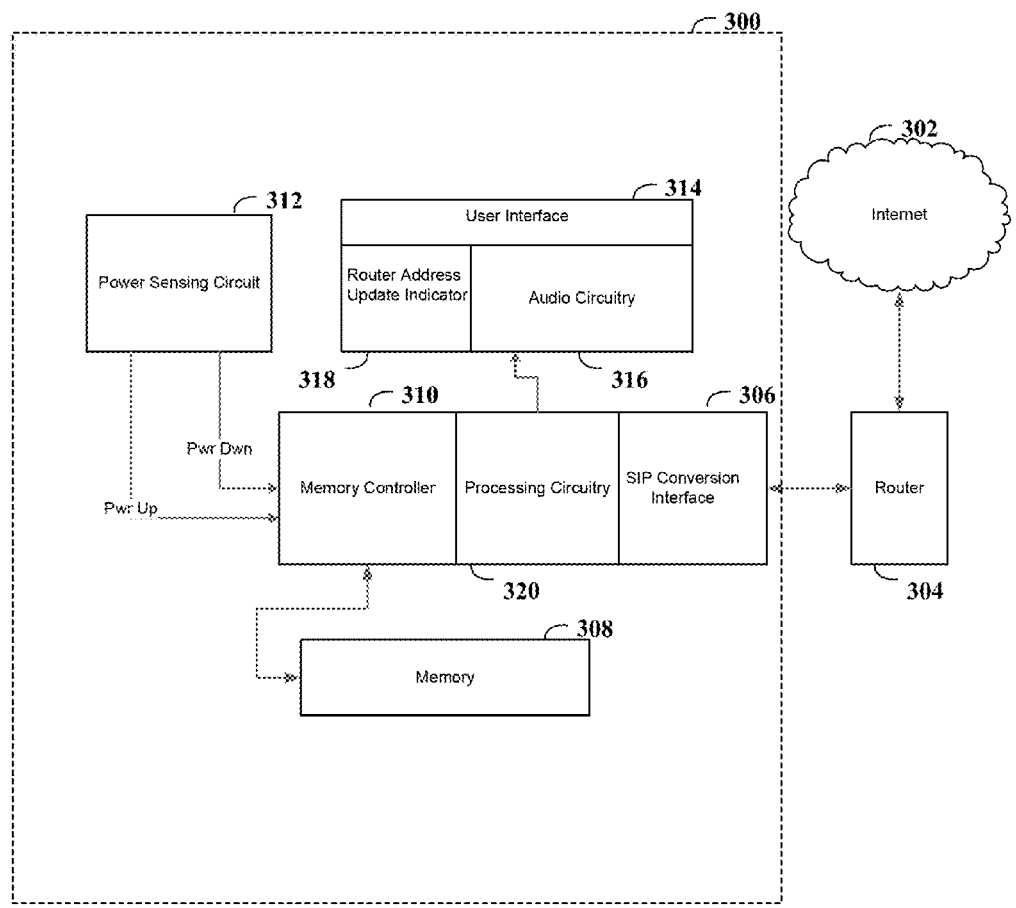
FIG. 3 is a block diagram of a VoIP device that prompts a VoIP user to update the physical location data of the user, according to example embodiments of the present invention.

FIG. 3 shows an endpoint device 300 adapted to automatically prompt a VoIP user to update his or her physical location data according to another example embodiment. The endpoint device 300 works with a VoIP telephone service that allows calls to be made to, and received from, traditional phone numbers using a high-speed (broadband) Internet connection (i.e., DSL, cable modem, or broadband wireless technology). The VoIP endpoint device 300 is connected to the Internet 302 via a router 304 that has a MAC address. The endpoint device communicates with the router through a SIP conversion interface 306. The MAC router address is stored in non-volatile memory 308, which is controlled and accessed by a memory controller 310.

A power sensing circuit 312 detects when the endpoint device has experienced a power state transition, more specifically, when the device has experienced a power-up. The power sensing circuit 312 communicates these transitions to the memory controller 310 so that upon a power-down, the memory controller 310 stores the MAC router address in memory 308. Similarly, upon power-up, the memory controller 310 accesses memory 308 to provide the router MAC address to processing circuitry 320, which performs a comparison of the current MAC router address with the MAC router address that was stored in memory 308 upon power-down.

The endpoint device 300 also has a user interface 314 that can include, for example, a keypad, audio receiver, and a display screen. The endpoint device 300 also has audio circuitry 316 for receiving and transmitting audio. Further, the endpoint device has a router address update indicator 318. The indicator 318 is preferably a visual indicator in the form of a light or LED. The indicator 318 may change colors depending on the status of the physical location data or preferably flashes at difference cadences to indicate the status. For example, a LED could slowly blink when the server is searching for an IP address, remain steady when no emergency service is available (such as at locations outside the United States), blink quickly when the physical location data needs to be updated as determined by the endpoint device, and pulse at two quick blinks every other second when the physical location data is up-to-date and the VoIP service is current and functional.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. A Voice over Internet Protocol (VoIP) device comprising
    power sensing circuitry configured and arranged to detect when the VoIP device has experienced a power up event;
    nonvolatile memory configured and arranged to store data in an absence of power; and
    processing circuitry configured and arranged to:
        provide access to a plurality of stored addresses, including MAC addresses,
        initiate VoIP calls over a packet transmission path that includes a routing node, and
        in response to the power sensing circuitry detecting a power up event for the VoIP device,
            obtain, from the nonvolatile memory, one of the addresses stored before the detected power up event,
            obtain, from the routing node and after the detected power up event, another address that identifies the routing node,
            compare the address stored before the detected power up event to the address obtained after the detected power up event,
            in response to the comparison indicating that the addresses match, obtain from a subsequent node, relative to the routing node and to the packet transmission path, a subsequent address that identifies the subsequent node after the detected power up event, and
            in response to the comparison indicating that the addresses, including MAC addresses, do not match, generate a request to update physical location data for the VoIP device.

2. The device of claim 1, wherein the routing node provides a local area network (LAN) connection to the VoIP device and the addresses are wide area network (WAN) addresses.

3. The device of claim 1, wherein the processing circuitry is further configured and arranged to, in response to the comparison indicating that the addresses do match:
    obtain, from the nonvolatile memory, another address stored before the detected power up event; and
    assess the subsequent address, and in response thereto, generate a request to update physical location data for the VoIP device.

4. The device of claim 1, wherein the processing circuitry is further configured and arranged to send an indication of a time of the detected power up event to a server and to generate the request to update physical location data in response to the server comparing the time of the detected power up event to a time of a most recent previous physical location update.

5. The device of claim 1, wherein the processing circuitry is further configured and arranged to generate the request to update physical location data by directing communications from the VoIP device to a physical location update interface provided by a server.

6. The device of claim 5, wherein the processing circuitry is further configured and arranged to interface with the physical location update interface that includes an interactive voice response system.

7. The device of claim 5, wherein the processing circuitry is further configured and arranged to interface with the physical location update interface that includes a website.

8. The device of claim 1, further including audio circuitry configured and arranged to receive and transmit audio.

9. The device of claim 1, wherein the device is further configured and arranged to contact an emergency service provider; and provide the emergency service provider with physical location data, in response to the request to update physical location data.

10. A Voice over Internet Protocol (VoIP) device comprising
    power sensing circuitry configured and arranged to detect when the VoIP device has experienced a power up event;
    nonvolatile memory configured and arranged to store data in an absence of power; and
    processing circuitry configured and arranged to, in response to the power sensing circuitry detecting a power up event for the VoIP device,
    obtain, from a subsequent node on a transmission path originating from the VoIP device, a first address;
    obtain, from the nonvolatile memory, a second address stored before the detected power up event; and
    obtain, in response to the first address matching the second address, a subsequent address, relative to a routing node and the transmission path, that identifies the subsequent node after the power up event
    generate, in response to the first address not matching the second address, a request to update physical location data for the VoIP device.

11. The device of claim 10, wherein processing circuitry is configured and arranged to store the first address in the nonvolatile memory.

12. The device of claim 10, wherein the first address is a MAC address corresponding to the subsequent node.

13. The device of claim 10, wherein the first address is a wide area network (WAN) address corresponding to the subsequent node.

\* \* \* \* \*